(12) United States Patent
Shimomura et al.

(10) Patent No.: US 6,873,804 B2
(45) Date of Patent: Mar. 29, 2005

(54) IMAGE SENSING DEVICE

(75) Inventors: Hidekazu Shimomura, Kanagawa (JP);
Ken Nishimura, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/922,643

(22) Filed: Aug. 7, 2001

(65) Prior Publication Data

US 2002/0051648 A1 May 2, 2002

(30) Foreign Application Priority Data

Aug. 9, 2000 (JP) ........................................ 2000-241782
Aug. 9, 2000 (JP) ........................................ 2000-241783
Aug. 9, 2000 (JP) ........................................ 2000-241784

(51) Int. Cl.[7] ............................................ G03G 15/00
(52) U.S. Cl. ............................................ 399/49; 399/74
(58) Field of Search .................... 329/49, 74, 302; 347/116; 356/445, 446; 382/281; 250/559.44

(56) References Cited

U.S. PATENT DOCUMENTS

| | | | | |
|---|---|---|---|---|
| 4,553,033 A | * | 11/1985 | Hubble et al. | 356/445 |
| 5,778,280 A | * | 7/1998 | Komiya et al. | 347/116 |
| 5,896,472 A | | 4/1999 | Takayama | 382/287 |
| 5,946,523 A | * | 8/1999 | Fujioka et al. | 399/49 |
| 6,285,849 B1 | | 9/2001 | Shimada et al. | 399/301 |
| 6,310,689 B1 | * | 10/2001 | Ishikawa et al. | 356/446 |
| 6,452,147 B1 | * | 9/2002 | Inada | 250/208.1 |

FOREIGN PATENT DOCUMENTS

JP  7-261628  10/1995

* cited by examiner

*Primary Examiner*—Hoan Tran
(74) *Attorney, Agent, or Firm*—Fitzpatrick, Cella, Harper & Scinto

(57) ABSTRACT

An image sensing device includes: a light source, a recording member on which an image is formed and conveyed in one direction, illumination system for causing a light beam emitted from the light source to obliquely illuminate the recording member and, imaging system for condensing specularly reflected light from the image on the recording member and causing the reflected light to travel to a surface of a photodetector, so that the image sensing device obtains positional information of the image on the recording member on the basis of a signal obtained by the photodetector. When the amount of displacement of the recording member in a vertical direction during conveyance of the recording member is d, an angle between the optical axis of the imaging system and a normal to the recording member is θ (degrees), and resolution of the image formed on the recording member is R (dpi), the components are set so that $d \cdot \tan \theta < (25.4/R) \times 1000$ is satisfied.

25 Claims, 13 Drawing Sheets

→ CONVEYANCE DIRECTION

FIG. 23A
FIG. 23B
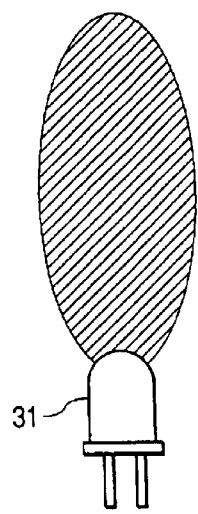
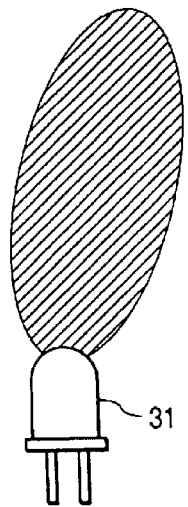
FIG. 24
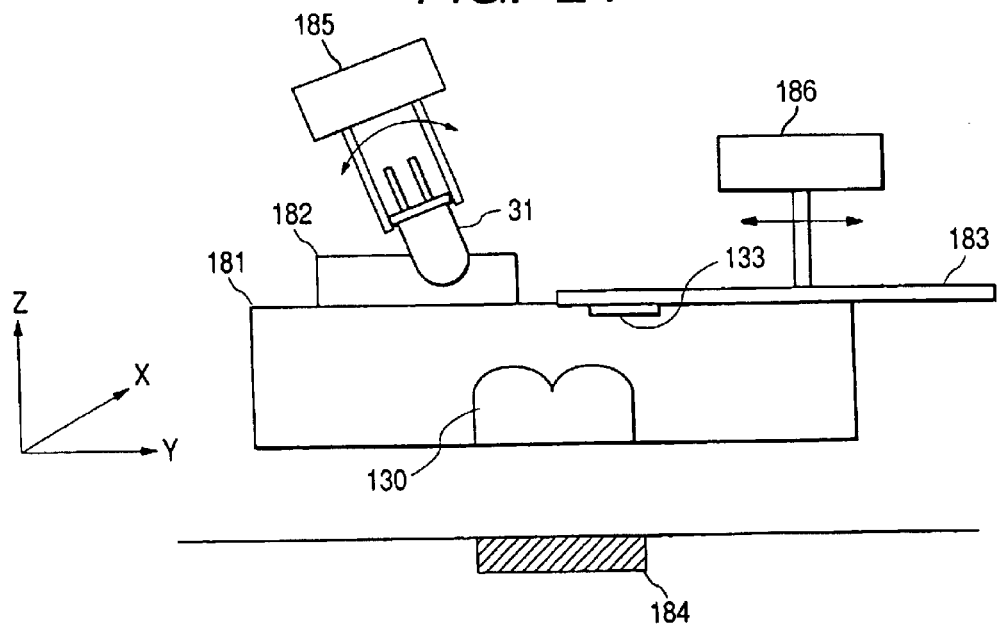

IMAGE SENSING DEVICE

BACKGROUND OF THE INVENTION

1. Field of the Invention

The present invention relates to an image sensing device and an image forming apparatus using the image forming device and, more particularly, to image sensing and image forming techniques suitable for a color image forming apparatus for obtaining a multicolor image (color image), e.g., an electrophotographic copying machine, a laser beam printer, a color printer, or a printing apparatus having a plurality of image forming units (image forming means).

2. Related Background Art

Conventional image forming apparatuses for forming multicolor images ordinarily performs an image forming process in which images in different colors, corresponding to a multicolor image, are formed by a plurality of image forming units and are transferred, by being superposed one on another, onto a sheet of paper transported by a transport means, e.g., a transport belt.

In such a process, even slight misregistration results in considerably degrading the image quality if a full-color image is formed by performing multicolor development in particular. For example, in the case of 400 dpi, even an amount of misregistration not exceeding a fraction of a pixel size of 63.5 $\mu$m, appearing as color registration error or a change in color tone, results in considerably degrading the image quality.

Conventionally, multicolor development is performed by using a single image forming unit, i.e., one scanning lens system. That is, optical scanning with fixed optical characteristics is performed to decrease the amount of image registration. This method, however, entails a problem in which a long time is required to output a multicolor or full-color image.

A solution of this problem is the method of forming images in different colors with separate optical scanning devices and superposing the images on a sheet of paper transported by a transport unit. If this method is used, there is a concern about color misregistration when images are superposed.

Japanese Patent Application Laid-open No. 7-261628 discloses an image forming apparatus capable of obtaining a good color image by correcting color misregistration in such an image superposition process.

In the image forming apparatus disclosed in this application as an apparatus which forms a multicolor image by performing multicolor development to form corresponding images in component colors by and by superposing these images, each of image forming units is controlled on the basis of a signal output from a position sensing means which includes an illumination system having a light emitting diode (LED) light source for illuminating with infrared light a position sensing mark for sensing the position of an image transferred onto an image transfer region, and an optical system for imaging the mark on a photodetector. The optical axis of the optical system is perpendicular to the surface on which the transferred image is formed.

In the process of forming a multicolor image by using this position sensing means to sense the position sensing mark, by controlling each image forming unit for multicolor development, and by superposing corresponding images, a sensing error due to a vertical displacement of a means for conveying images, e.g., a transfer belt can be minimized to enable the mark to be detected with accuracy, so the multicolor image to be obtained with improved quality.

FIG. 13 is a diagram showing an image sensing device for sensing color misregistration caused as described above.

Referring to FIG. 13, a position sensing pattern (image) 86 drawn on a recording member 84, which is an intermediate transfer belt, is irradiated with light emitted from a light emitting portion 81a of a light source means 81, condensed by a condensing portion 81b, and reaching the pattern by passing through a dustproofing glass 87.

Light specularly reflected by the position sensing pattern 86 is sensed by a light receiving means 83 through the dustproofing glass 87, a stop 85 and an imaging lens 82.

Image forming units (image forming means) are controlled on the basis of sensing signals obtained by the light receiving means 83 to output images in component colors.

FIG. 14 shows a state where, in the image sensing device shown in FIG. 13, a light beam emitted from the light source 81 at an emission angle of 6.8 degrees travels to the light receiving means 83.

FIG. 25 is a diagram showing another image sensing device for sensing color misregistration caused as described above.

Referring to FIG. 25, a position sensing pattern (image) 106 drawn on a recording member 108, which is an intermediate transfer belt, is irradiated with light emitted from a light emitting portion 101a of a light source means 101, condensed by a condensing portion 101b and an illumination lens 104, and reaching the pattern by passing through a dustproofing glass 107.

Light specularly reflected by the position sensing pattern 106 is sensed by a light receiving means 103 through the dustproofing glass 107, a stop 105 and an imaging lens 102.

Image forming units (image forming means) are controlled on the basis of sensing signals obtained by the light receiving means 103 to output images in component colors.

FIGS. 18A through 18D are diagrams showing states of color misregistration in an image forming apparatus.

The position of an image in a normal state is indicated by 7 and the position of the image (image area) in a case where color misregistration has occurred is indicated by 8 (8a, 8b, 8c, or 8d). In FIGS. 18A, 18B, and 18C showing cases where color misregistration has occurred in the main scanning direction (the direction along the Y-axis), the two lines are illustrated in a state of being spaced apart from each other in the direction of conveyance (the sub-scanning direction, the direction along the X-axis) for ease of explanation. FIG. 18A shows color misregistration due to an inclination of the main scanning direction, as in a case where there is an inclination between an optical unit and a photosensitive drum. In such a case, misregistration is corrected in the direction of the arrow by, for example, adjusting the position of the optical unit, the photosensitive drum or a lens. FIG. 18B shows color misregistration due to a variation in the width of main scanning lines, as in a case where there is a variation in the distance between the optical unit and the photosensitive drum. Such misregistration is liable to occur if the optical unit is a laser scanner. In such a case, misregistration is corrected in the directions of the arrows by changing the length of scanning lines through fine adjustment of the image frequency (increasing the frequency if the scanning width is longer), for example. FIG. 18C shows a writing position error in the main scanning direction. If the optical unit is a laser scanner, the error is corrected in the direction of the arrows by, for example, adjusting timing of writing from the sensed beam position, for example. FIG. 18D shows a writing position error in the sheet transport direction (the direction along the X-axis). This error is corrected in the direction of the arrow by, for example, adjusting timing of writing in each color from the sensed sheet edge position.

SUMMARY OF THE INVENTION

In view of the above-described circumstances, an object of the present invention is to provide an image sensing device and an image forming apparatus which are used to perform the process of forming a multicolor image by detecting position detection marks for detecting the position of each of images in component colors, by controlling image forming sections for multicolor development, and by superposing the component color images, in which the components for detecting the position detection marks are suitably set to ensure accurate detecting of the position detection marks, and with which a high-quality color image can easily be obtained.

Another object of the present invention is to provide an image sensing device and an image forming apparatus which are used to perform the process of forming a multicolor image by detecting images in component colors (position detection patterns), by controlling image forming sections for multicolor development, and by superposing the component color images, in which the configuration of the image sensing device for detecting images (position sensing patterns) is suitably set to ensure accurate detecting of images (position detection patterns), and with which a high-quality color image can easily be obtained.

To achieve the above-described objects, according to a first aspect of the present invention, there is provided an image sensing device comprising:

light source means;

a recording member on which an image is formed and conveyed in one direction;

illumination means for causing a light beam emitted from the light source means to obliquely illuminate the recording member; and imaging means for condensing specularly reflected light from the image on the recording member and causing the reflected light to travel to a surface of light receiving means, the image sensing device obtaining positional information of the image on the recording member on the basis of a signal obtained by the light receiving means, wherein when the amount of displacement of the recording member in a vertical direction during conveyance of the recording member is d, an angle between the optical axis of the imaging means and a normal to the recording member is θ (degrees), and resolution of the image formed on the recording member is R (dpi), the components are set so that $d \cdot \tan \theta < (25.4/R) \times 1000$ is satisfied.

According to a second aspect of the present invention, in the first aspect of the invention, the angle θ (degrees) satisfies $5° < \theta < 35°$.

According to a third aspect of the present invention, in the first aspect of the invention, the light source means comprises an LED light source, and the illumination means includes an irradiation lens for condensing a light beam from the LED light source and causing the light beam to travel to the recording member.

According to a fourth aspect of the present invention, in the first aspect of the invention, the imaging means includes an imaging lens for forming, onto a surface of the light receiving means, an image on the recording member.

According to a fifth aspect of the present invention, in the first aspect of the invention, the device further comprises an imaging lens for imaging, on the light receiving means, the image on the recording member, wherein when imaging magnification of the imaging lens is assumed to be β, $0.75 < |\beta| < 1.25$ is satisfied.

According to a sixth aspect of the present invention, in the first aspect of the invention, the angle θ (degrees) satisfies $25° < \theta < 35°$.

According to a seventh aspect of the present invention, in any one of the first to fifth aspects of the invention, the image forming apparatus forms a color image by using the image sensing device.

According to an eighth aspect of the invention, there is provided an image sensing device comprising:

light source means;

illumination means including an irradiation lens for irradiating, with a light beam from the light source means, a recording member on which an image is formed; and imaging means including an imaging lens for forming, onto a surface of a light receiving means, the image on the recording member, the image sensing device detecting the image on the recording member on the basis of a signal obtained by the light receiving means, wherein when the recording member has a specular reflection surface, a stop is provided at or close to a position to be conjugate with the light emitting point of the light source means.

According to a ninth aspect of the present invention, in the eighth aspect of the invention, when the imaging magnification of imaging of the light emitting point of the light source is imaged at the conjugate position is assumed to be β, $1 < |\beta| < 7$ is satisfied.

According to a tenth aspect of the present invention, in the eighth aspect of the invention, the aperture of the stop has a size substantially equal to or smaller than the size of the image of the light emitting point of the light source means.

According to an eleventh aspect of the present invention, in the eighth aspect of the invention, the stop is disposed between the imaging means and the light receiving means.

According to a twelfth aspect of the present invention, in the eighth aspect of the invention, the light receiving means detects the image formed on said recording member to obtain positional information of the image.

According to a thirteenth aspect of the present invention, in the eighth aspect of the invention, the light receiving means detects density of the image formed on the recording member.

According to a fourteenth aspect of the present invention, in an image forming apparatus including an image sensing device according to any one of the eighth to thirteenth aspects of the invention, the image forming apparatus forms a color image by using the image sensing device.

According to a fifteenth aspect of the present invention, there is provided an image sensing device comprising:

light source means;

illumination means including an irradiation lens for irradiating, with a light beam from the light source means, a recording medium on which an image is formed; and imaging means including an imaging lens for forming, on a surface of a light receiving means, the image on the recording medium, the image sensing device detecting the image on the recording member on the basis of a signal obtained by the light receiving means, wherein the irradiation lens and the imaging lens are formed integrally with each other and made of a same material.

According to a sixteenth aspect of the present invention, in the fifteenth aspect of the invention, at least one of the irradiation lens and the imaging lens has at least one rotationally symmetrical aspherical surface.

According to a seventeenth aspect of the present invention, in the fifteenth aspect of the invention, at least one of the irradiation lens and the imaging lens has at least one anamorphic surface.

According to an eighteenth aspect of the present invention, in the fifteenth aspect of the invention, at least one surface of the irradiation lens and the imaging lens is inclined relative to a surface normal to the recording member.

According to a nineteenth aspect of the present invention, in the fifteenth aspect of the invention, at least one of the surface of the irradiation lens and the imaging lens on the recording member side is flat.

According to a twentieth aspect of the present invention, in the fifteenth aspect of the invention, an optical axis of the irradiation lens and an optical axis of the imaging lens have equal angles formed in opposite directions from a surface normal to the recording member.

According to a twenty-first aspect of the present invention, in the fifteenth aspect of the invention, the light source means is provided with a moving mechanism capable of displacing to an arbitrary position.

According to a twenty-second aspect of the present invention, in the fifteenth aspect of the invention, the light receiving means is provided with a moving mechanism capable of displacing to an arbitrary position.

According to a twenty-third aspect of the present invention, in the fifteenth aspect of the invention, the imaging means has a stop, and a light emitting surface of the light receiving means and the stop are made substantially conjugate with each other when a surface of the recording member is a specular reflection surface.

According to a twenty-fourth aspect of the present invention, in the fifteenth aspect of the invention, the light receiving means detects the image formed on the recording member to obtain positional information of the image.

According to a twenty-fifth aspect of the present invention, in the fifteenth aspect of the invention, the light receiving means detects density of the image formed on the recording member.

According to a twenty-sixth aspect of the present invention, in an image forming apparatus including an image sensing device according to any one of the first to eleventh aspects of the invention, the image forming apparatus forms a color image by using the image sensing device.

BRIEF DESCRIPTION OF THE DRAWINGS

FIGS. 23A and 23B are diagrams showing the distributions of quantities of light emitted from LEDs;

FIG. 24 is a diagram showing essential portion of the image sensing device and an optical axis alignment jig in accordance with the present invention.

DESCRIPTION OF THE PREFERRED EMBODIMENTS

Embodiments of the present invention will be described with reference to the accompanying drawings.

(First Embodiment)

Figure 6:
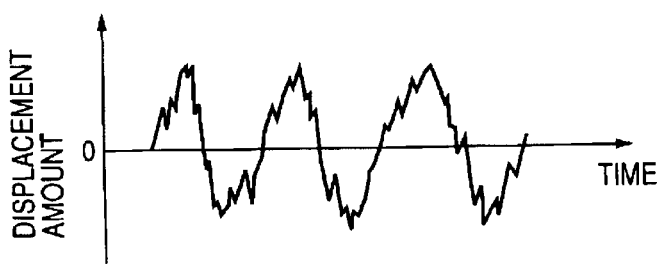
FIG. 6 is a diagram showing the amount of displacement in the vertical direction.

In general, the method of detecting marks for sensing the positions of images formed on a belt in a conveyance section and controlling image forming units on the basis of signals obtained by sensing the marks to output images in component colors entails a problem described below. The belt in the conveyance section is displaced in the vertical direction by undulations or the like such as shown in FIG. 6. Therefore the unit for sensing the image position sensing marks needs to be capable of accurately detecting the drawing positions even when the belt is displaced in the vertical direction.

For example, when the belt is repeatedly displaced in the vertical direction, a signal obtained by a photodetector used as a means for sensing image position sensing marks contains noise, and it is difficult to obtain accurate information on the positions of the position sensing marks.

Figure 1:
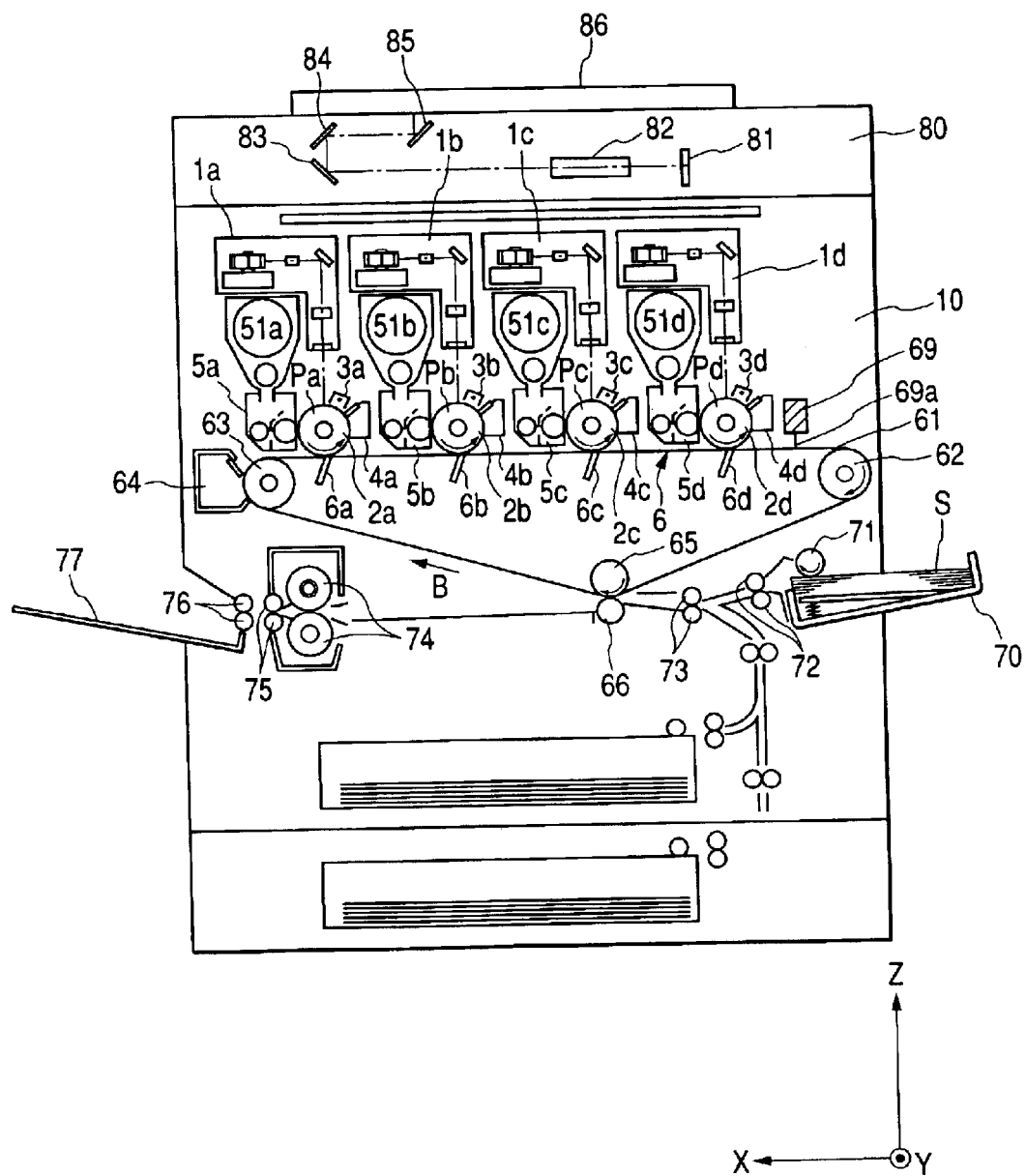
FIG. 1 is a diagram showing essential portions of an image forming apparatus in a first embodiment of the present invention.

FIG. 1 is a diagram schematically showing essential portions of a first embodiment of the present invention, in which an image forming apparatus having an image sensing device in accordance with the present invention is arranged as a digital full-color copying machine.

The configuration and functions of the digital full-color copying machine shown in FIG. 1 will first be described.

An image reader unit indicated by 80 in FIG. 1 is arranged such that image information on a color image placed on an original glass plate 86 is formed on reading means surface 81 by means of mirrors 83, 84, and 85 and a reading lens 82 and is read.

Color image information from the reading means 81 is input to a full-color image forming unit 10, in which four image forming stations (image forming sections (image forming means) Pa to Pd) are arranged. The image forming stations (Pa to Pd) respectively have photosensitive drums (2a to 2d) provided as image bearing members.

Around each photosensitive drum are disposed components for use at the corresponding station only: a charging means (3a, 3b, 3c, or 3d); a scanning optical device (1a, 1b, 1c, or 1d) for irradiating the surface of the photosensitive drum with a light beam according to image information; development means (5a, 5b, 5c, or 5d); a drum cleaning means (4a, 4b, 4c, or 4d); and a transfer means (6a, 6b, 6c, or 6d).

Developer containers 51a to 51d are provided in correspondence with the development means (5a to 5d). The developer containers 51a to 51d are placed immediately below horizontal portions of the scanning optical devices (1a to 1d) and along vertical portions of the scanning optical devices. A cylindrical developer cartridges is detachably attached to each developer container to replenish a developer. At the image forming stations (Pa to Pd) are respectively formed a cyan image, a magenta image, a yellow image, and a black image.

An intermediate transfer belt (recording member) 61 in the form of an endless belt is disposed below the photosensitive drums (2a to 2d) and moves through the image forming stations (Pa to Pd). The intermediate transfer belt (recording member) 61 is wrapped around a drive roller 62 and driven rollers 63 and 65. A cleaning means 64 for cleaning the surface of the transfer belt 61 is provided.

Each of the scanning optical devices (1a to 1d) has a semiconductor laser provided as a light source, an incident optical means for enabling the light beams emitted from the semiconductor laser to reach a polygon mirror, imaging means for forming an image on the surface of the photosensitive drum (2a, 2b, 2c, or 2d) with the light beam deflected by the polygon mirror, the imaging means having optical elements such as a toric lens, a spherical lens and an aspherical lens, a reflecting mirror provided between the toric lens and the other optical elements, and an accommodation means for integrally accommodating these optical elements.

In the thus-arranged copying machine, a latent image of a cyan component of image information is first formed on the surface of the photosensitive drum 2a by a well-known means for electrophotographic processing including exposure, constituted by the charging means 3a, and the scanning optical device 1a of the first image forming station Pa. This latent image is formed into a visible cyan toner image by the development means 5a using a developer having cyan toner. The cyan toner image is transferred onto the surface of the intermediate transfer belt 61.

While the cyan toner image is being transferred onto the intermediate transfer belt 61, a magenta component latent image is formed at the second image forming station Pb, and a corresponding toner image formed of magenta toner is obtained by the development means 5b. This magenta toner image is transferred onto the intermediate transfer belt 61 by the transfer means 6b so as to be accurately superposed on the toner image transferred at the first image forming station Pa.

Subsequently, yellow and black images are formed in the same manner to complete transfer of toner images in the four colors onto the intermediate transfer belt 61 in a state of being superposed on one another. Thereafter, the toner images in the four colors are again transferred (in secondary transfer) by a secondary transfer roller 66 onto a sheet S which has been transported from a sheet feed cassette 70 by a feed roller 71, a pair of transport rollers 72 and a pair of registration rollers 73, with the transfer operation being correctly timed.

After the secondary transfer, the toner images transferred onto the sheet S are fixed by being heated to obtain a full-color image on the sheet S. The sheet S on which the full-color image is formed is transported to a tray 77 via rollers 75 and 76.

After transfer from each of the photosensitive drums (2a to 2d), residual toner is removed by the cleaning means (4a, 4b, 4c, or 4d) to make the photosensitive drum ready for formation of the next image.

An image sensing device is indicated by 69. Image sensing devices of the same configuration are respectively placed at three positions or two positions: inner, intermediate and front positions or inner and front positions on the intermediate transfer belt 61 as viewed in the FIG. 1.

The surface of the intermediate transfer belt 61 is in a state close to a mirror-finished state.

In this embodiment, before an image forming process is started, each of the image forming sections Pa, Pb, Pc, and Pd forms position sensing marks (patterns) 69a as images corresponding to the image forming section.

That is, each section forms four images.

In the following, for ease of description, only one mark will be referred to representing the left and right pair of the position sensing marks.

Prior to execution of the process of the image forming sections, each image sensing device 69 detects the positional information of images 69a formed on non-image forming regions on the respective photosensitive drums and transferred to the intermediate transfer belt 61 along the direction of conveyance to output a position information signal. The image forming sections Pa, Pb, Pc, and Pd are controlled by a control unit (not shown) on the basis of the position information signals.

As a result, a color image is formed on the intermediate transfer belt without color misregistration.

In the coordinate system referred to below, the Y-axis corresponds to the main scanning direction (direction perpendicular to the drawing sheet), the X-axis corresponds to the sub-scanning direction (the direction of conveyance by the intermediate transfer belt shown as the left-right direction in the figure), and the Z-axis is perpendicular to the X-axis and to the Y-axis.

Figure 2:
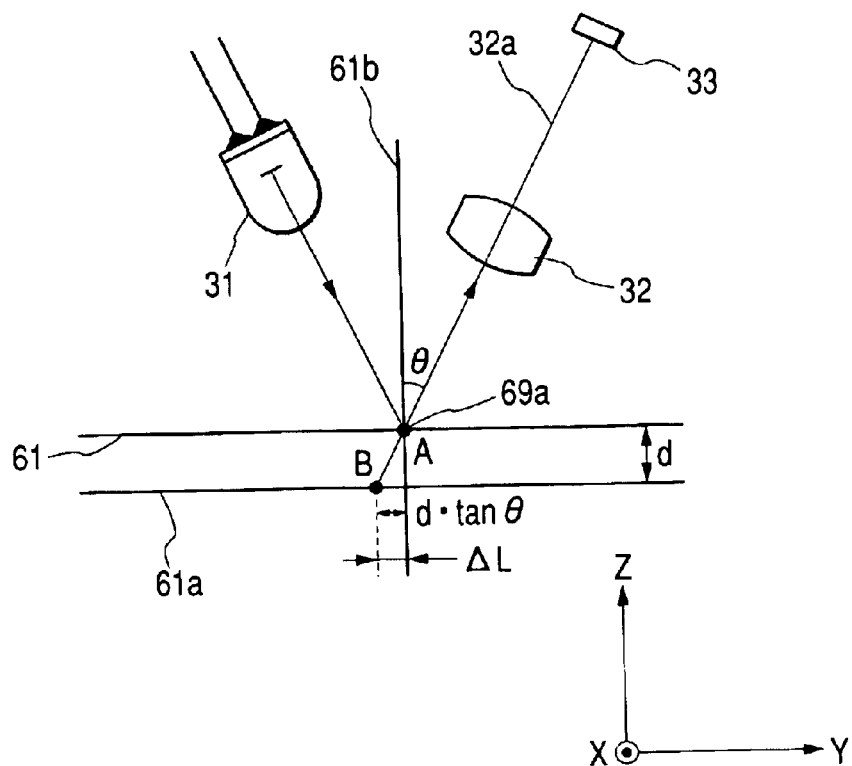
FIG. 2 is a diagram schematically showing the image sensing device shown in FIG. 1.

FIG. 2 is a cross-sectional view of an essential portion of the image sensing device 69 shown in FIG. 1.

Figure 3:
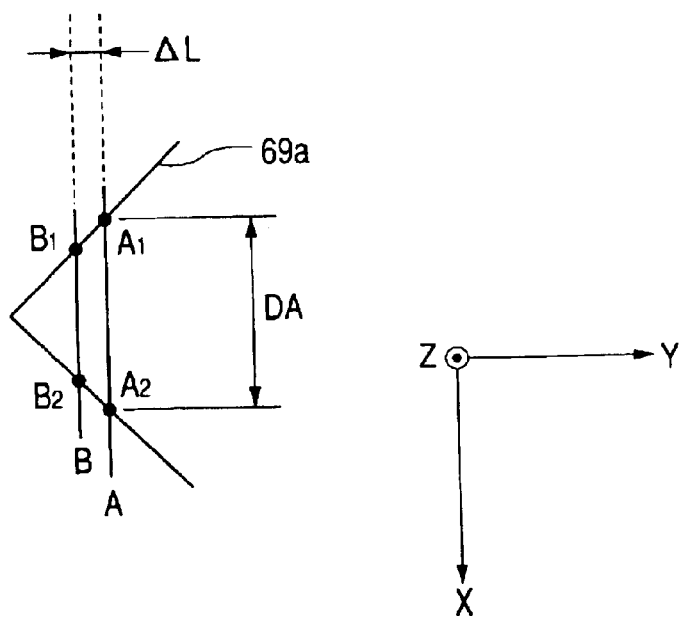
FIG. 3 is a diagram showing the position sensing mark shown in FIG. 2.

FIG. 3 is a diagram showing the position sensing mark 69a shown in FIG. 1 for explanation.

Referring to FIG. 2, the transfer conveyance belt is indicated at 61 and reference numeral 31 denotes a LED light source for obliquely illuminating, the position sensing mark (toner image) 69a formed on the transfer conveyance belt 61.

An imaging optical system 32 condenses specularly reflected light from the position sensing mark 69a formed on the transfer conveyance belt 61 to form an image of the position sensing mark 69a on a sensor (photodetector) 33 such as a charge-coupled device (CCD).

Information on the position of the position sensing mark 69a is obtained through a signal from the sensor 33.

In this embodiment, when the position sensing mark 69a formed on the transfer conveyance belt 61 by toner or the like is irradiated with light emitted from the light source 31, i.e., the LED light lamp or the like for producing infrared light when reaching a point below the sensing portion of the image sensing device 69 which reads the position sensing mark for sensing of the position of an image conveyed by the movement of the conveyance belt 61. Part of reflected light scattered by the position sensing mark formed by toner or the like is imaged by the imaging optical system 32 on the photodetector (sensor) 33 and is read by the photodetector 33, which is, for example, a CCD, and which has sufficient sensitivity to infrared light.

Ordinarily, the spectral reflectance in the visible range of the position sensing mark varies with respect to different kinds of toner for cyan, magenta, yellow, black, etc. However, if a light source for generating infrared light is used, the output from the photodetector 33 can be stably obtained.

At this time, if the height of the conveyance belt changes (displaced in the Z-direction), the detected position of the registration mark changes to result in detection as an image registration error.

In this embodiment, the amount of image misregistration is limited by setting the relating components as described below.

The position sensing mark 69a is a chevron-like mark such as shown in FIG. 3. (The pattern of the position sensing mark 69a is not limited to this and any other pattern may be used.)

The sensor 33 measures the distance between two points A1 and A2 in the chevron-like mark in the direction of conveyance by the transfer conveyance belt 61 (along the X-axis) to obtain the positional relationship between the sensor 33 and the transfer conveyance belt 61 along the main scanning direction (the transverse direction, the direction along the Y-axis), i.e., the positional relationship between the image forming section (Pa, Pb, Pc, or Pd) and the transfer conveyance belt 61.

Figure 4A:
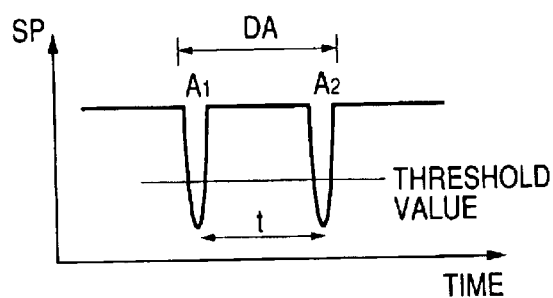
FIGS. 4A and 4B are diagrams showing an output signal when the intermediate transfer belt is not displaced in the vertical direction, and an output signal when the intermediate transfer belt is displaced in the vertical direction.
Figure 4B:
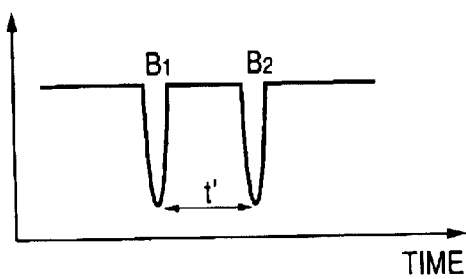
Figure 5:
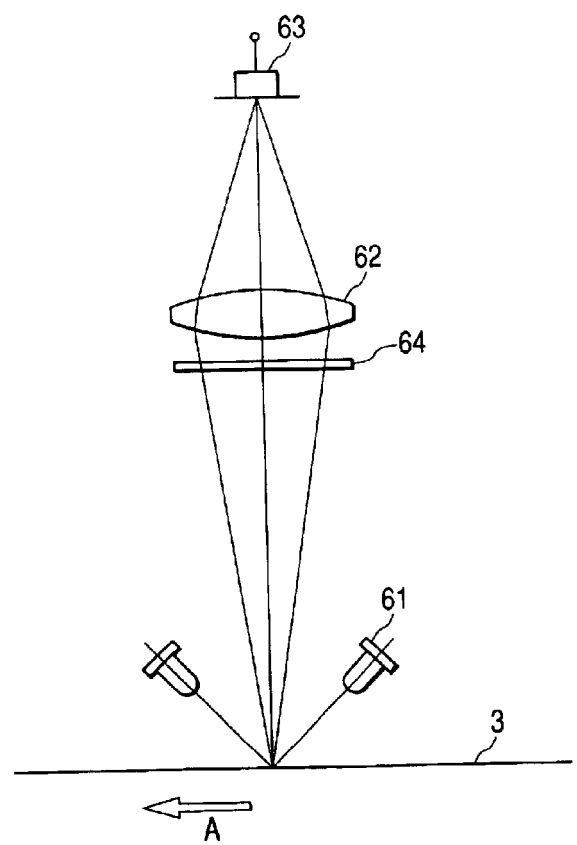
FIG. 5 is a diagram schematically showing a conventional image sensing device.

FIGS. 4A and 4B are diagrams for explaining information on the position of the position sensing mark 69a obtained by the sensor 33.

Each of FIGS. 4A and 4B shows changes in output SP from the sensor 33 when the position sensing mark 69a reaches the position below the sensor 33 by the operation of the transfer conveyance belt 61.

When the image of the position sensing mark 69a moves across the sensing portion of the sensor 33, light striking the mark is scattered by the mark, so that the quantity of light specularly reflected from the transfer conveyance belt 61 and received by the sensor 33 is reduced, resulting in a reduction in level of output signal SP.

The reduction in level of output signal SP is determined by setting a threshold value to obtain the time period t between the moment at which the point A1 of the mark 69a moves across the sensing portion of the sensor 33 and the moment at which the point A2 moves across the sensing portion. From the time period t, a distance DA between the points A1 and A2 is obtained.

From the distance DA, the positional relationship between the image forming section (Pa, Pb, Pc, or Pd) and the transfer conveyance belt 61 is obtained.

A situation will be considered in which, when the position of the position sensing mark 69a is detected to obtain position information, the transfer conveyance belt 61 is displaced by a distance d in the vertical direction (the Z-direction) to a position 61a, as shown in FIG. 2.

Let the angle between the optical axis 32a of the imaging optical system (sensing means) 32 and the normal 61b to the surface of the intermediate transfer belt 61 to be θ.

In this event, the point A in the position sensing mark 69a detected by the sensor 33 is laterally shifted (along the main scanning direction) to a point B by ΔL=d·tan θ.

The distance to be read is not between the points A1 and A2 but between points B1 and B2, so that a detection error ΔL occurs.

The time period of the detections is changed to a time period t', as shown in FIG. 4B.

For example, in a case where the image forming apparatus has a resolution of 600 dpi (pixel size: 42.3 μm) and the transfer conveyance belt 61 is displaced in the vertical direction by 100 μm, a detection error described below occurs.

If the angle θ between the optical axis of the imaging lens 32 and the normal to the transfer conveyance belt 61 is θ=30, $$\Delta L = d \cdot \tan\theta = 100 \cdot \tan 30 = 57.7 \ (\mu m)$$

In terms of the number of pixels, this detection error is 57.7/42.3=1.36 (pixels), about 1.4 pixels.

If the amount of displacement d of the intermediate transfer belt 61 in the vertical direction is reduced, the error ΔL in detecting the position sensing mark is small.

However, it is extremely difficult to reduce the displacement of the intermediate transfer belt 61 because of some structural and mechanical factors.

Also, if the angle θ between the optical axis 32a of the imaging lens 32 and the normal to the transfer conveyance belt 61 is reduced, the sensing error ΔL becomes small.

However, it is difficult to reduce the angle θ by changing the placement of the light source means 31 and the light receiving means 33 since the light receiving means receives specularly reflected light from the intermediate transfer belt 61 in the light beam from the light source means.

In this embodiment, to limit the detection error to a value not larger than the size of one pixel, the transfer conveyance belt and the elements of the sensing optical system are set so that if the resolution of the image forming apparatus is R (dpi), the detection error ΔL (μm) is $$\Delta L = d \cdot \tan\theta < (25.4/R) \times 1000$$

The unit dpi is the number of pixels per inch.

Also, if the angle θ (degrees) is within the range:

$$5° < \theta < 25°,$$

the components of the image sensing device can be suitably placed without making the entire apparatus complicated while high accuracy of sensing of the position sensing mark is maintained.

In particular, it is preferable to set the angle within the range:

$$25° < \theta < 35°.$$

Further, if the magnification at which the imaging lens images the position sensing mark 69a on the sensor 33 is β, the imaging optical system is arranged so that the magnification is set within the range:

$$0.75 < |\beta| < 1.25.$$

That is, the magnification includes a 1:1 ratio, so that the accuracy with which the position of the position sensing mark is read with the sensor 33 to obtain position information is sufficiently high.

If the magnification is out of this range, it is difficult to assemble the components so as to maintain the desired sensing accuracy.

As described above, the image forming apparatus of the present invention forms a multicolor image by performing multicolor development to form corresponding images on the basis of image information and by superposing the developed images.

The image forming apparatus controls the image forming sections (Pa, Pd, Pc, and Pd) on the basis of detection signals output from the position sensing means (69) to correct misregistration of transferred images. To correct transferred image misregistration, the image forming apparatus uses means for transferring image position sensing marks (69a) to image transfer areas, the conveyance member 61 that conveys the transferred image position sensing marks, the illumination system 31 placed downstream in the direction of movement of the conveyance member 61 to illuminate the image position sensing marks 69a with infrared light, and the optical system 32 for forming an image of each image position sensing mark on the photodetector 33. The apparatus obtains a good multicolor image by suitably setting these components.

According to the present invention, an image sensing device and an image forming apparatus can be provided which are used to perform the process of forming a multicolor image by detecting position sensing marks for detecting the position of each of images in component colors, by controlling image forming sections for multicolor development, and by superposing the component color images, in which the components for detecting the position sensing marks are suitably set to ensure accurate detection of the position sensing marks, and with which a high-quality color image can easily be obtained.

(Second Embodiment)

With respect to the conventional image sensing devices, the positional relationship between the light emitting portion of the light source and the stop provided in the vicinity of the imaging lens is not specified.

Figure 14:
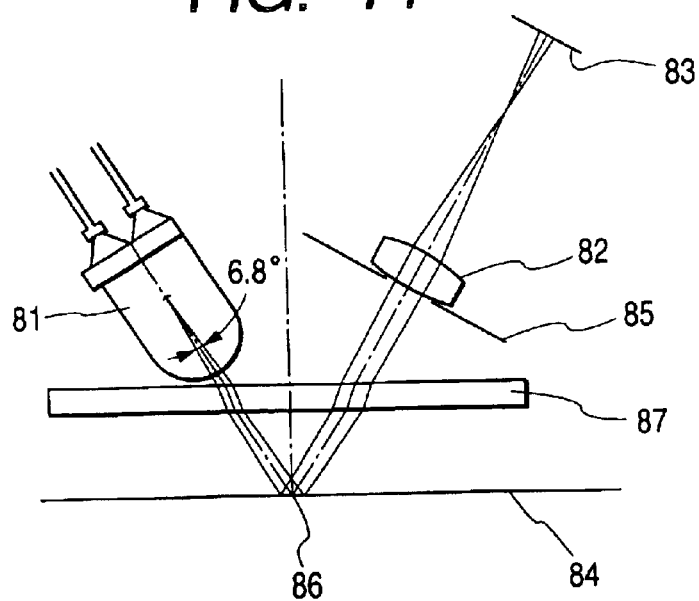
FIG. 14 is a diagram schematically showing the optical path of a conventional image sensing device.
Figure 15:
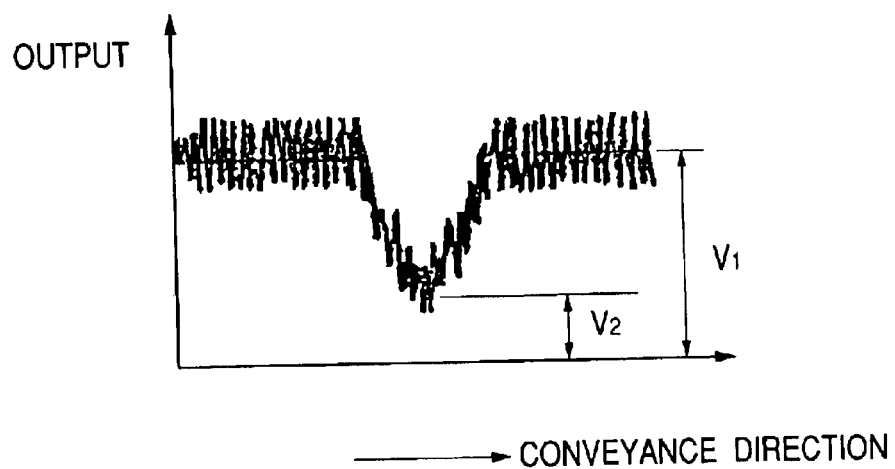
FIG. 15 is a diagram showing a signal waveform when a position sensing mark is read by the conventional image sensing device.

Therefore, as shown in FIG. 14, only a beam of a small quantity of light from the light source 81 is incident upon the sensor 83 and it is not possible to obtain a sufficiently high level of signal output from the light receiving means 83. This means that the image detection accuracy is not sufficiently high. FIG. 15 shows an output waveform when the position sensing mark 86 is read by the light receiving means 83.

In FIG. 15, $V_1$ represents an output signal when specularly reflected light from the recording member is received, and $V_2$ represents an output signal when diffused light from a sensing mark formed of a toner image (position sensing mark) is received.

Figure 16:
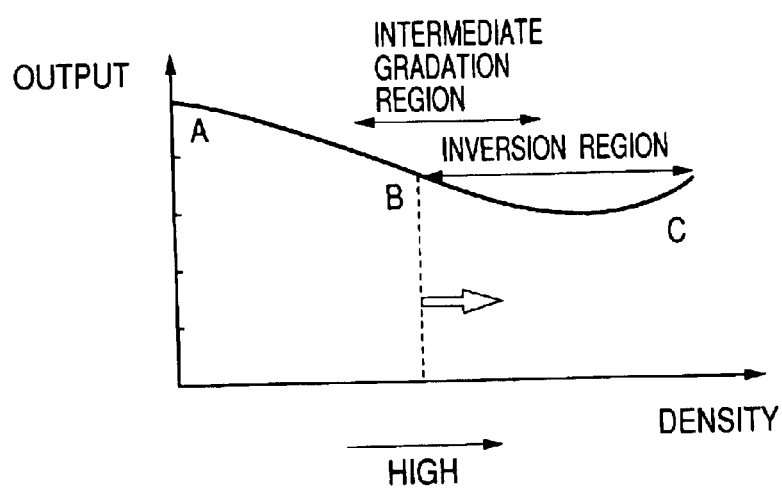
FIG. 16 is a diagram showing the relationship between the image density and the signal output in the conventional image sensing device.
Figure 17:
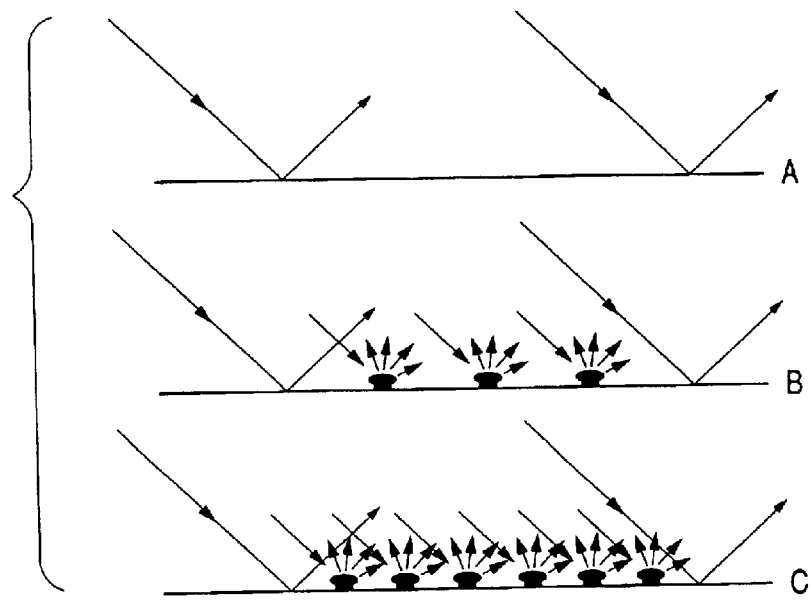
FIG. 17 is a diagram showing light specularly reflected by the recording member and light diffused by toner.
Figure 18A:
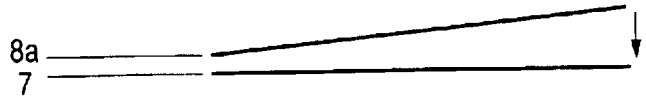
FIGS. 18A, 18B, 18C and 18D are diagram showing examples of color misregistration.
Figure 18B:
Figure 18C:
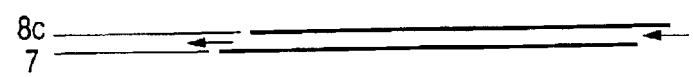
Figure 18D:
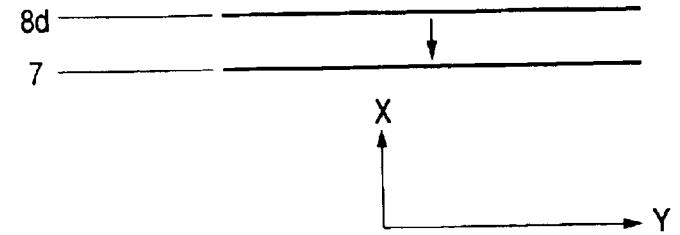

Generally, the sensing accuracy is improved if the ratio of the signal output values (S/N ratio) $V_1/V_2$ in such a situation is higher. FIG. 16 shows the relationship between the image density and the signal output in a case where an image sensing device which obtains the output signal by detecting the density of the position sensing pattern is used as a density detection device. FIG. 17 shows the relationship between light specularly reflected by a recording member and light diffused by toner.

A description will be made below with reference to FIGS. 16 and 17.

At point A, there is no toner on the recording medium and only specularly reflected light from the recording member travels toward the sensor. In the region from point A to point B, specularly reflected light from the recording member and diffused light from toner on a portion of the recording member travel toward the sensor. In this region, the quantity of specularly reflected light reduced by the toner image is larger than the quantity of light diffused by the toner image, so that the sensor output decreases monotonously.

At an intermediate point between point B and point C, the quantity of light diffused by the toner image is increased and the signal output starts increasing. In the region where this inversion phenomenon occurs (the region on the right-hand side of the dotted line in the graph), it is theoretically impossible to obtain image information by detecting the density.

Ordinarily, the highest accuracy is required in the region from point B to point C (halftone region). However, there is the problem of inability to perform detection in this halftone region.

A second embodiment of the present invention also has the same essential components as those illustrated in FIG. 1 with respect to the first embodiment. In the second embodiment, an image forming apparatus having an image sensing device in accordance with the present invention is arranged as a digital full-color copying machine shown in FIG. 1, as is that in the first embodiment.

Figure 7:
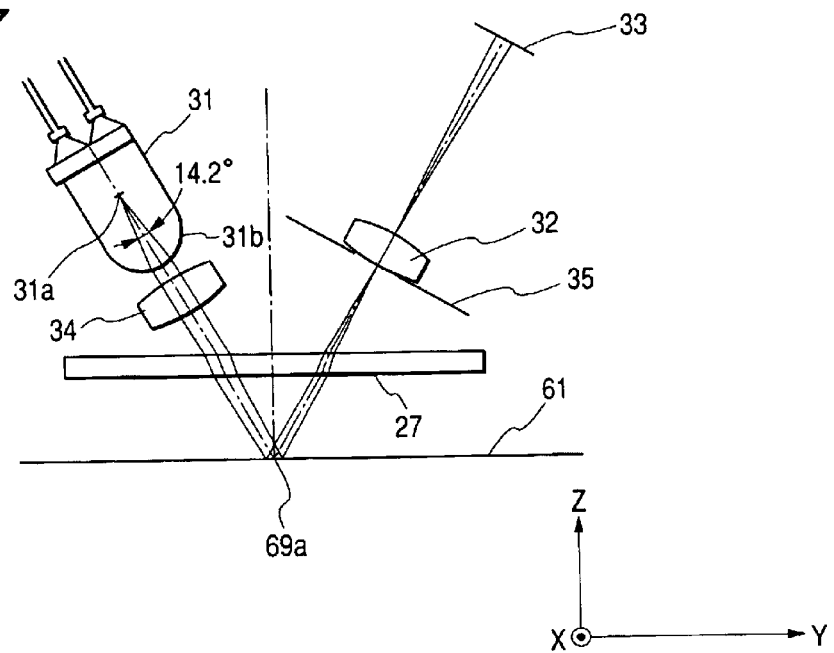
FIG. 7 is a diagram schematically showing an essential portion of an image sensing device in a second embodiment of the present invention.

FIG. 7 is a cross-sectional view of an essential portion of an image sensing device 69 used in the image forming apparatus of the second embodiment. The image sensing device 69 detects the position or density of an image. The left-right direction as viewed in FIG. 7 corresponds to the main scanning direction (Y-direction) of the image forming apparatus, while the direction (X-direction) perpendicular to the drawing sheet corresponds to the direction of conveyance by the intermediate transfer belt (recording member) (the sub-scanning direction).

Reference numeral 31 denotes an LED light source 31 illuminating a toner image 69a for detection of position, drawn on the intermediate transfer belt 61. A light beam from a light emitting portion 31a of the light source 31 is condensed on a condensing portion 31b.

An illumination lens 34 constitutes an illumination means for condensing the light beam emitted from the light source 31. An imaging lens 32 constitutes image formation means for imaging on a light receiving means 33, specularly reflected light from the intermediate belt 61 and diffused reflected light from toner image 69a.

A stop 35 is provided in the vicinity of the imaging lens 32.

A dustproofing glass 27 is also provided. With respect to light specularly reflected by the intermediate transfer belt 61, the light emitting portion 31a of the light source 31 and the stop 35 are made substantially optically conjugate with each other at least by the condensing portion 31b and the illumination lens 34. ("substantially" in the preceding sentence signifies that a relationship slightly different from a completely conjugate relationship may suffice if the object of the present invention is achieved.)

If the stop 35 is in the imaging lens 32 or closer to the light receiving means 33 side compared to the imaging lens 32, the light emitting portion 31a of the light source 31 and the stop 35 are made substantially optically conjugate with each other by the condensing portion 31b, the illumination lens 34 and a portion or the entire of the imaging lens 32.

The efficiency of illumination of toner image 69a with the light beam from the light source 31 is thereby improved. Also, the beam of specularly reflected light from the intermediate transfer belt 61 is thereby enabled to enter the light receiving means 33 with improved efficiency.

The imaging magnification $\beta$ of the light emitting portion 31a on the surface of the stop by the illumination lens 34 and the condensing portion 31b is $|\beta|=5.9$.

Figure 8:
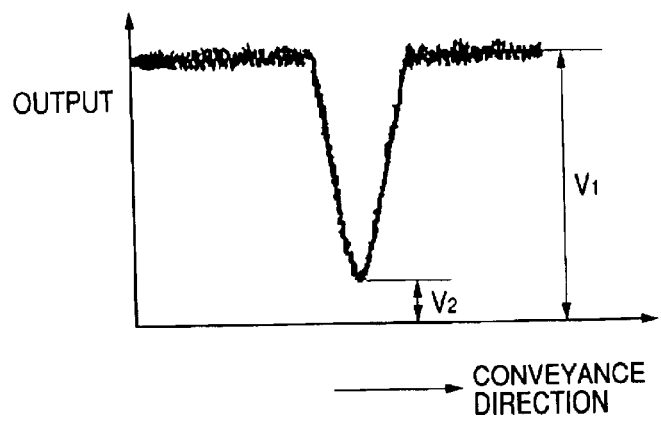
FIG. 8 is a diagram showing a signal waveform when a position sensing mark is read by the image sensing device of the present invention.

FIG. 8 is a diagram showing a waveform signal obtained by the light receiving means 33 of the image sensing device shown in FIG. 7.

Signal $V_1$ is a signal value when specularly reflected light from the intermediate transfer belt 61 is incident upon the light receiving means.

Signal $V_2$ is a signal value when illumination light is scattered by the position detection pattern (toner image) (not specularly reflected) to reduce the quantity of light incident upon the light receiving means 33.

In this embodiment, the S/N ratio ($V_1/V_2$) of the signal is increased to enable position information to be obtained from the position detection pattern with improved accuracy.

Figure 9:
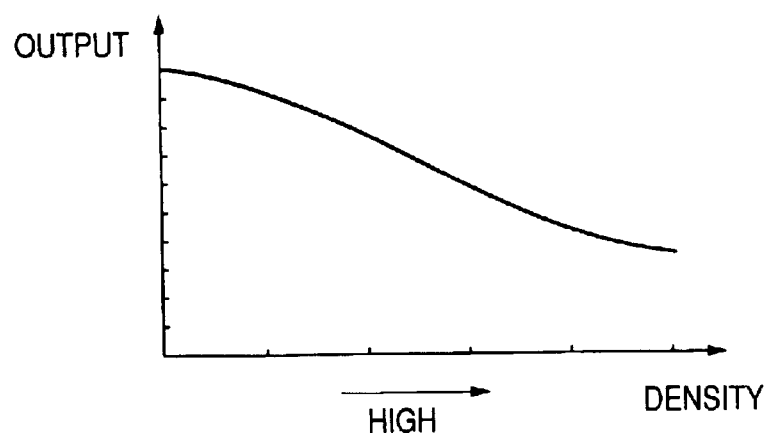
FIG. 9 is a diagram showing the relationship between the image density and the signal output in the image sensing device of the present invention.

FIG. 9 shows a signal output obtained by the light receiving means according to the density of the position detection pattern (toner image) when the image sensing device detects the density of the position detection pattern.

In this embodiment, the intermediate region of the image (toner image) is free from the inversion phenomenon and the density can be measured with accuracy.

(Third Embodiment)

Figure 10:
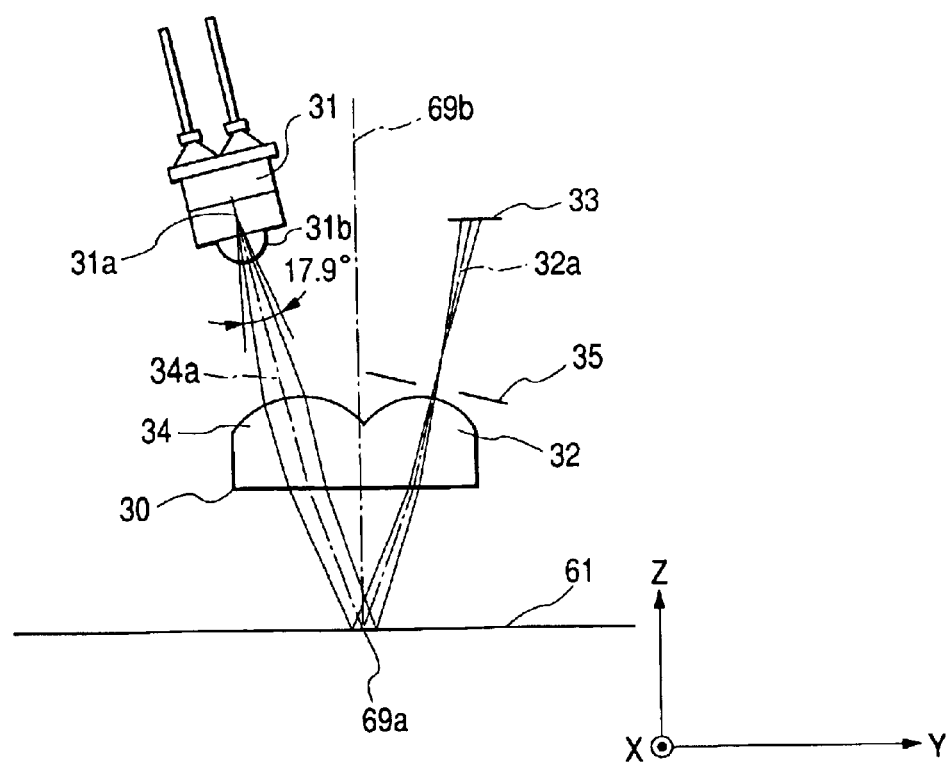
FIG. 10 is a diagram schematically showing an essential portion of an image sensing device in a third embodiment of the present invention.

FIG. 10 is a cross-sectional view of an essential portion of an image sensing device 69 which is used in the image forming apparatus in accordance with the present invention, and which represents a third embodiment of the present invention. The image sensing device 69 detects the position or density of an image. The left-right direction (Y-direction) as viewed in FIG. 10 corresponds to the main scanning direction of the image forming apparatus while the direction (X-direction) perpendicular to the drawing sheet corresponds to the direction of conveyance by the intermediate transfer belt (recording member) (the sub-scanning direction).

A LED light source 31 illuminates a toner image for detection of position, drawn on the intermediate transfer belt 61. An optical component 30 is integrally formed of an imaging lens 32 and an illumination lens 34, which are made of the same material. The imaging lens 32 constitutes image formation means for imaging specularly reflected light from the toner image on the sensor (light receiving means) 33, and comprises a rotationally symmetrical aspherical surface.

The illumination lens 34 constitutes an illumination means for condensing the light beam emitted from the light source 31, and comprises a rotationally symmetrical aspherical surface. The illumination efficiency and imaging performance are improved by using this optical component. A stop 35 is provided in the vicinity of the imaging lens 32. The light emitting portion 31a and the stop 35 are made substantially optically conjugate with each other by the illumination lens 34, a lens surface 31b of the LED lens 31, and the imaging lens 32.

The illumination lens 34 and the imaging lens 32 may be equal or different in refractive power.

The illumination lens 34 and the imaging lens 32 have their optical axes 34a and 32a inclined in the opposite directions through the same angle from an axis (surface normal) 69b which is perpendicular to the intermediate transfer belt 61 including the detection pattern 69a.

Figure 11:
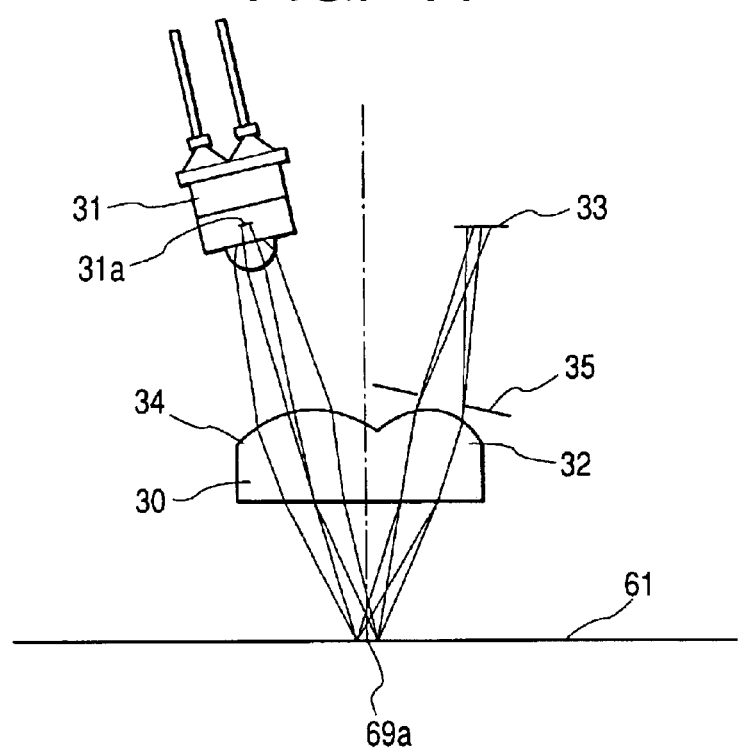
FIG. 11 is a diagram showing the optical path of the image sensing device in the third embodiment of the present invention.

FIG. 11 shows optical paths in which light beams from opposite ends of the light emitting portion travel. In this embodiment, the size of the light emitting portion 31a of the LED light source 31 is 0.4×0.4 mm and the size of the image of the light emitting portion imaged in the vicinity of the stop 35 is 2.0×2.0 mm. That is, the imaging magnification $|\beta|$ is 5.0. The size of the stop 35 is set to have a diameter of 2.0 mm, which is the same as the size of the image of the light emitting portion 31a, thereby enabling specularly reflected light to travel to the sensor 33 with efficiency while limiting diffused light from toner image 69a.

It is also possible to cause a light beam having a wider radiation angle to travel to the sensor by increasing the imaging magnification $|\mu|$. In such a case, however, even a slight misalignment of the light emitting portion from the design center appears as a large shift of the image of the light emitting portion on the stop, so that the sensitivity to mounting of the LED is increased. Therefore it is preferred that the imaging magnification $|\beta|$ be not smaller than 1 and not larger than 7.0.

That is, according to the present invention, the range of the imaging magnification $|\beta|$ is, preferably, $1<|\beta|<7$, and, more preferably, $1.5<|\beta|<6$.

In this embodiment, the imaging lens 32, the illumination lens 34 and the stop are thus formed to improve the illumination efficiency, the imaging performance and the sensing accuracy.

(Fourth Embodiment)

Figure 12:
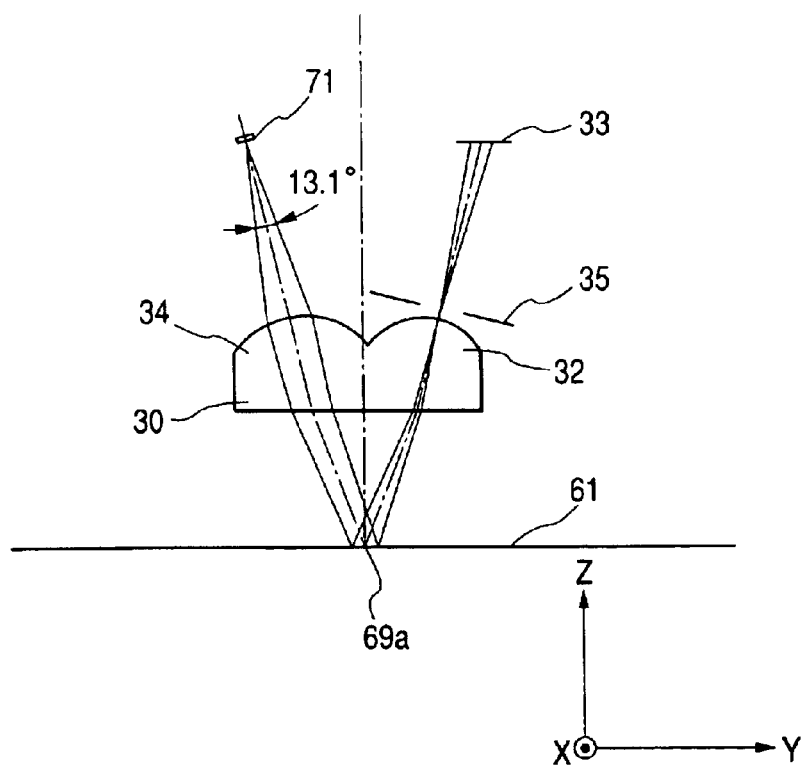
FIG. 12 is a diagram showing the optical path of an image sensing device in a fourth embodiment of the present invention.
Figure 13:
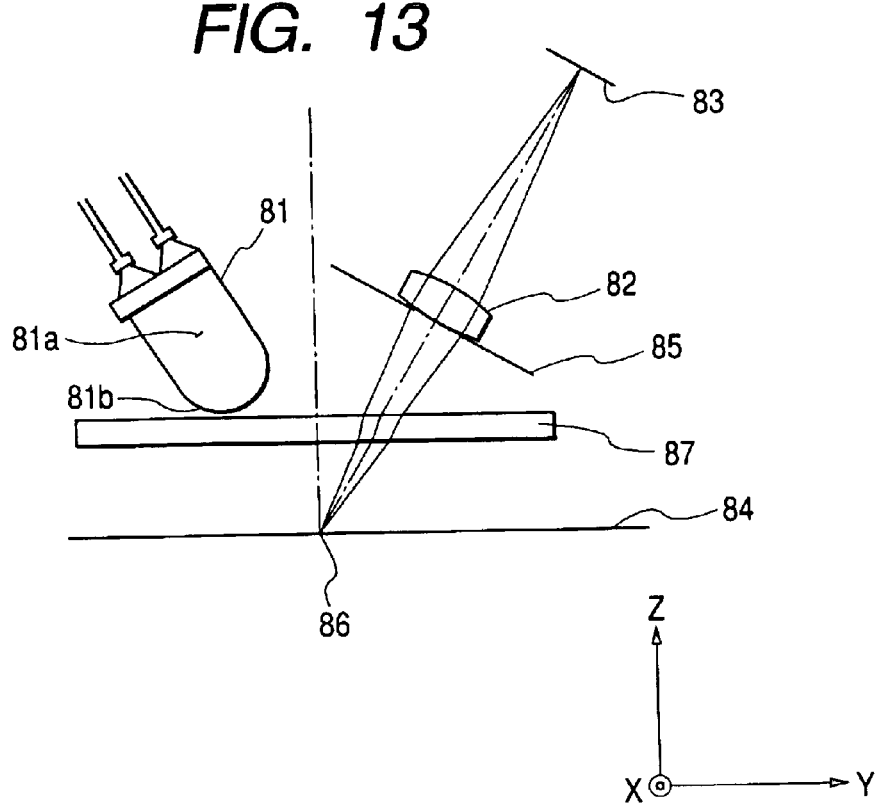
FIG. 13 is a diagram schematically showing an essential portion of a conventional image sensing device.

FIG. 12 is a diagram showing an essential portion of an image sensing device which represents a fourth embodiment of the present invention.

This embodiment is characterized by using a chip type of LED 71. In other respects, this embodiment is the same as the first and second embodiments. The imaging magnification $|\beta|$ of the imaging lens 32 in this embodiment is 1.8. Setting the imaging magnification $|\beta|$ is 1.0 or less should be avoided because the sensor output level is thereby reduced below the desired level, resulting in deterioration in sensing accuracy.

In the above-described embodiments, the stop 35 may be disposed in the imaging lens 32 or between the intermediate transfer belt 61 and the imaging lens 32 as well as between the imaging lens 32 and the light receiving means 33.

Also, the components of the image formation means may be arranged to form a transmission type of imaging means such that a light beam transmitted through a pattern on the intermediate conveyance belt is condensed to be incident upon the light receiving means, instead of forming the reflection type of imaging means for condensing reflected light from the pattern on the intermediate conveyance belt in the light beam from the illumination means so that the reflected light is incident upon the light receiving means.

According to the present invention, an image sensing device and an image forming apparatus can be provided which are used to perform the process of forming a multicolor image by sensing images in component colors (position detection patterns), by controlling image forming sections for multicolor development, and by superposing the component color images, in which the configuration of the image sensing device is suitably set to ensure accurate sensing of images (position detection patterns), and with which a high-quality color image can easily be obtained.

(Fifth Embodiment)

Figure 25:
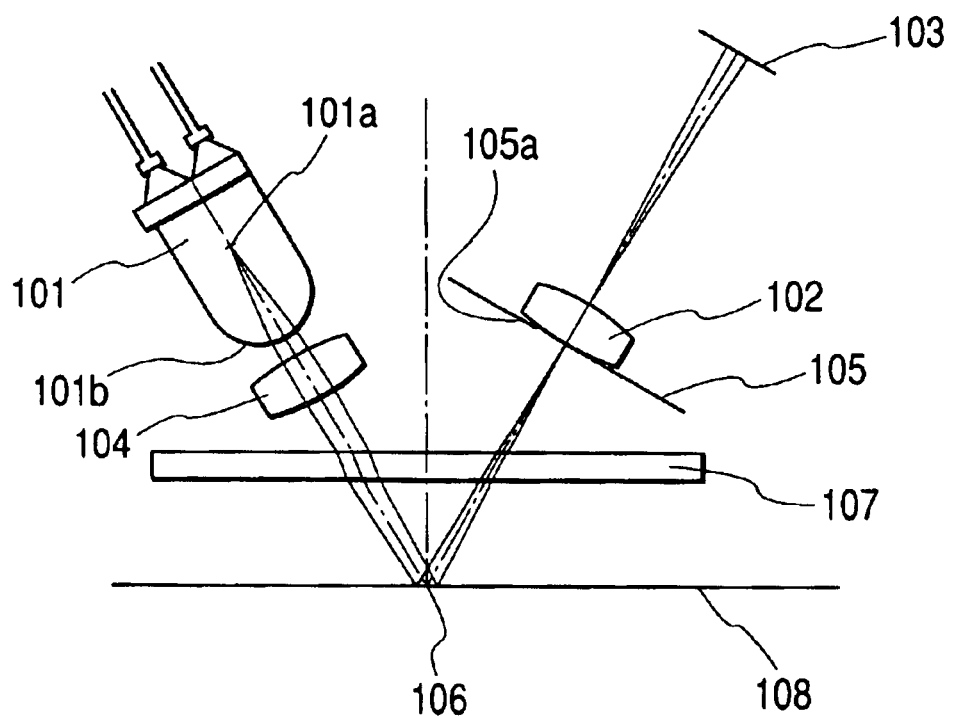
FIG. 25 is a diagram schematically showing an essential portion of a conventional image sensing device.

The image sensing device shown in FIG. 25 has the illumination lens 104 for condensing the light beam from an LED 101 provided as a light source, the dustproofing glass 107 for protecting the image sensing device against toner scattered from the intermediate transfer belt or recording member 108, etc., thus requiring a comparatively large number of component parts. Also, the manufacturing cost of the device shown in FIG. 25 is high since each of the illumination lens 104 and the imaging lens 102 is made of glass.

Moreover, since image 106 is read by detecting specularly reflected light from the intermediate transfer belt 108, it is necessary to incline the lens optical axis from an axis (surface normal) perpendicular to the intermediate transfer belt 108, so that the necessary device structure is complicated.

Further, to improve the reading accuracy, it is necessary to cause the light beam from the light emitting point 101a of the LED 101 to travel to the detection pattern 106 with efficiency and to cause the light beam specularly reflected by the pattern to be incident upon the pupil 105 of the imaging lens 102. Conventionally, the illumination lens 104 is disposed with reference to the external configuration of the LED 101. However, the light emitting portion 101a of the LED 101 has a large variation with respect to the external configuration, and some error in manufacturing the LED may result in failure to obtain a sufficiently large quantity of light at the light receiving means. The desired performance cannot be achieved with reliability.

A fifth embodiment of the present invention also has the same essential components as those illustrated in FIG. 1 with respect to the first embodiment. In the fifth embodiment, an image forming apparatus having an image sensing device in accordance with the present invention is arranged as a digital full-color copying machine.

Figure 19:
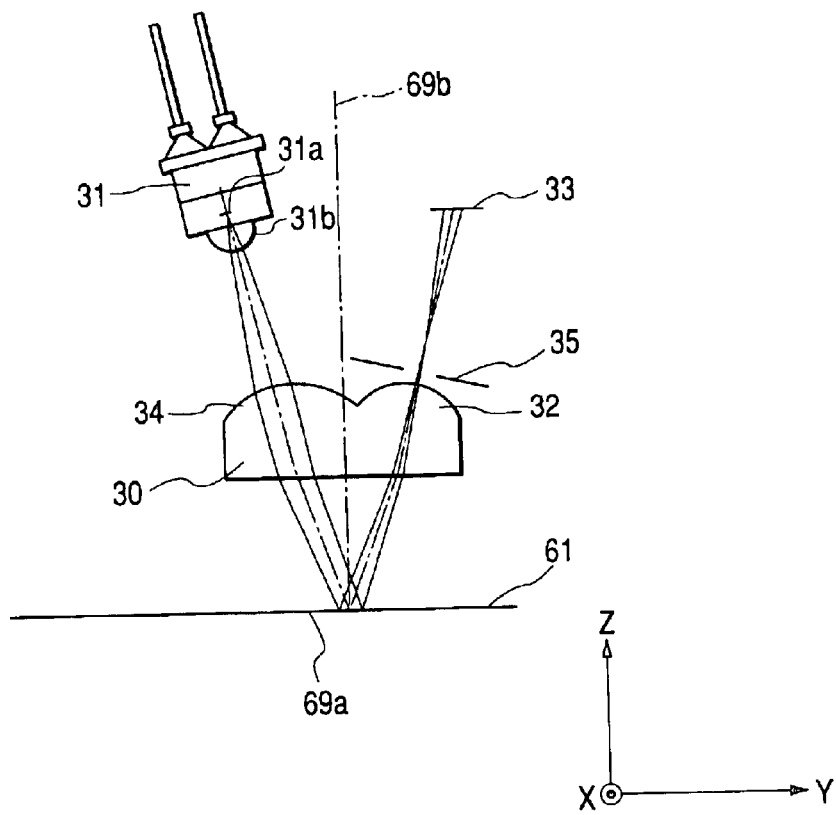
FIG. 19 is a cross-sectional view of an essential portion of an image sensing device in a fifth embodiment of the present invention.

FIG. 19 is a cross-sectional view of an essential portion of an image sensing device 69 used in the image forming apparatus of the fifth embodiment. The image sensing device 69 detects the position or density of an image. The left-right direction (Y-direction) as viewed in FIG. 19 corresponds to the main scanning direction of the image forming apparatus, while the direction (X-direction) perpendicular to the drawing sheet corresponds to the direction of conveyance by the intermediate transfer belt (recording member) (the sub-scanning direction). A LED light source 31 illuminates a toner image for detection of position, drawn on the intermediate transfer belt 61.

An optical component 30 is integrally formed of an imaging lens 32 and an illumination lens 34, which are made of the same material. The imaging lens 32 constitutes image formation means for imaging specularly reflected light from the toner image on the sensor (light receiving means) 33, and comprises a rotationally symmetrical aspherical surface. The illumination lens constitutes an illumination means for condensing the light beam emitted from the light source 31, and comprises a rotationally symmetrical aspherical surface. The illumination efficiency and imaging performance are improved by using this optical component. A stop 35 is provided in the vicinity of the imaging lens 32. The light emitting portion 31a and the stop 35 are made substantially optically conjugate with each other by the illumination lens 34, a lens surface 31b of the LED lens 31, and the imaging lens 32.

The illumination lens 34 and the imaging lens 32 may be equal or different in refractive power.

Figure 20:
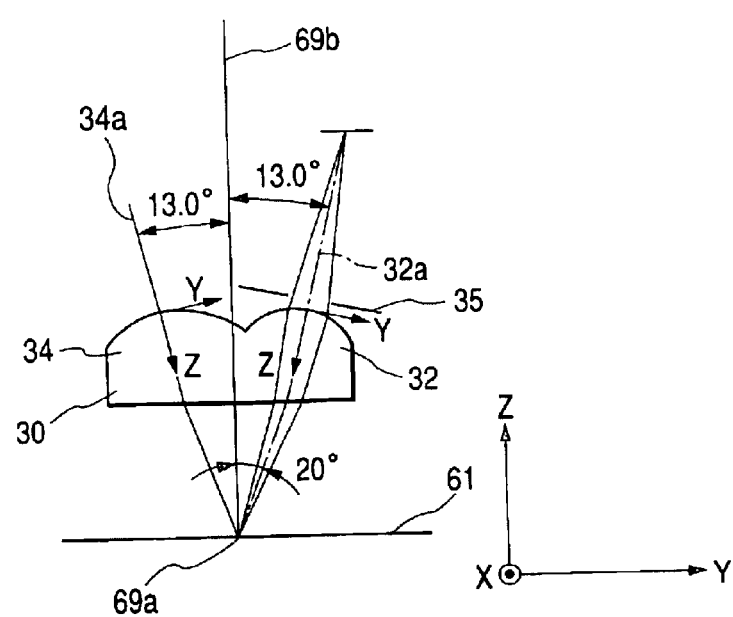
FIG. 20 is a cross-sectional view of an essential portion of the image sensing device in the fifth embodiment of the present invention.

FIG. 20 is a diagram for explaining the placement of the elements of the optical component 30. As is apparent from FIG. 20, the illumination lens 34 and the imaging lens 32 are constituted by rotationally symmetrical aspherical surfaces expressed by equations shown below and having their optical axes 34a and 32a inclined in the opposite directions through the same angle 13° from an axis (surface normal) 69b which is perpendicular to the intermediate transfer belt 61 including the detection pattern 69a.

In the following equations, R represents a reference spherical surface, and K and A are aspherical coefficients.

$$Z = (H^2/R)/\{1+\sqrt{1-(1+K)(H/R)^2}\} + A \cdot H^4 \quad (1\text{-}1)$$

$$H = X^2 + Y^2 \quad (1\text{-}2)$$

The X-axis is set along the direction perpendicular to the drawing sheet, the Z-axis is set along the lens optical axis, and the Y-axis is set as an axis perpendicular to each of the X- and Z-axes (see FIG. 20).

The imaging lens 32 and the illumination lens 34 are thus formed to improve the illumination efficiency and the imaging performance.

Table 1 shows the aspherical coefficients of the lenses.

Figure 21:
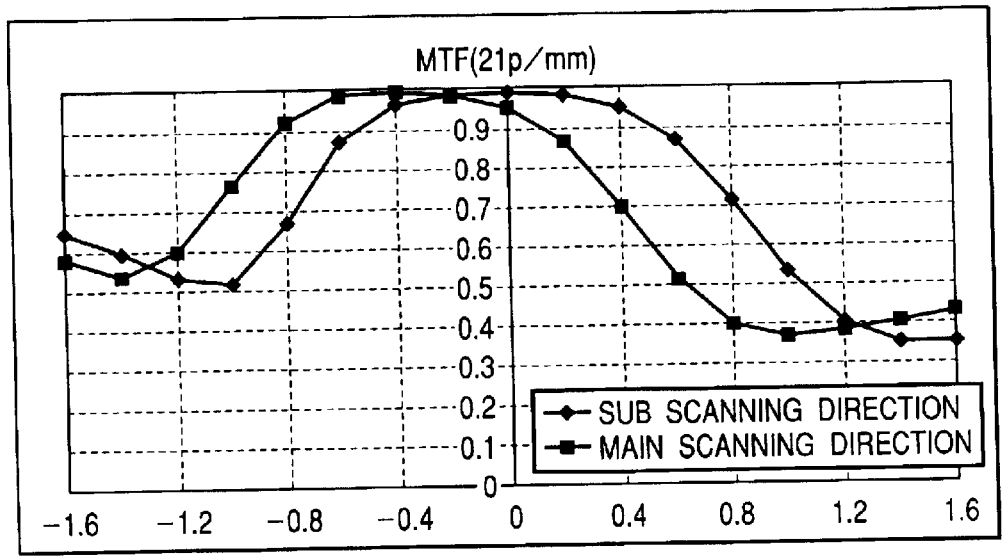
FIG. 21 is a diagram showing MTF in a case where a rotationally symmetrical aspherical surface is used in an imaging lens.

If the rotationally symmetrical aspherical surfaces are disposed in an inclined state as described above, one of the surfaces can effectively perform the imaging function while the other surface effectively perform the illumination function. FIG. 21 shows modulation transfer function (MTF) defocus curves of the imaging lens at 2 lp/mm. It can be understood from the curves that spherical aberration is sufficiently corrected and the peak value is high.

TABLE 1

| | Illumination lens | Imaging lens |
| --- | --- | --- |
| R | 3.500 | 2.203 |
| K | $-8.060 \times 10^{-1}$ | $-3.162$ |
| A | | $1.828 \times 10^{-2}$ |

Also, this integral optical component 30 is formed of an optical resin by injection molding. Further, the surfaces of the two elements of the optical component 30 on the recording member 61 side are formed flat to also have a function similar to that of dustproofing glass, thereby enabling cleaning of contamination by toner, etc., without causing unevenness in wiping. Thus, the number of component parts is reduced and the construction is simplified in comparison with the conventional arrangement.

The surfaces of the imaging lens 32 and the illumination lens 34 on the recording member 61 side may be formed as surface having a certain curvature.

(Sixth Embodiment)

A sixth embodiment of the present invention will be described.

In the sixth embodiment, an anamorphic surface is used as a surface of the imaging lens in the optical component 30. The shape of the surface is specifically defined by equations and coefficients shown below. This arrangement ensures effective correction of an astigmatic difference which occurs in the decentered optical system, thereby further improving the optical performance.

Meridional Configuration $$Z=(Y^2/R)/\{1+\sqrt{1-(1+K_y)(Y/R)^2}\}+A \cdot Y^4 \quad (2\text{-}1)$$

The meridional configuration is a curve along which each of the rotationally symmetric aspherical surfaces defined by equations (1-1) and (1-2) intersects the YZ plane (in the plane of FIG. 20)

Sagittal Configuration $$S=(x^2/r)/\{1+\sqrt{1-(1+K_x)(x/r)^2}\}+D \cdot x^4 \quad (2\text{-}2)$$

The sagittal configuration of a curve exists on a cross section (sagittal configuration cross section) perpendicular to tangent to the meridional configuration at a point on the meridional configuration, and the sagittal apex corresponds to the point of intersection of the meridional configuration and the sagittal configuration cross section. The y-axis is set in a direction of the meridional configuration tangent, the z-axis is set as an axis existing in the plane of the drawing sheet and perpendicular to the y-axis, and the x-axis is set as an axis perpendicular to each of the y- and z-axes.

Table 2 shows aspherical terms with respect to the anamorphic aspheric lens.

TABLE 2

|  | Meridional configuration | Sagittal configuration |
| --- | --- | --- |
| R/r | 2.203 | 2.158 |
| $K_y/K_x$ | −3.162 | |
| A/D | $1.828 \times 10^{-2}$ | $-1.6752 \times 10^{-2}$ |

Figure 22:
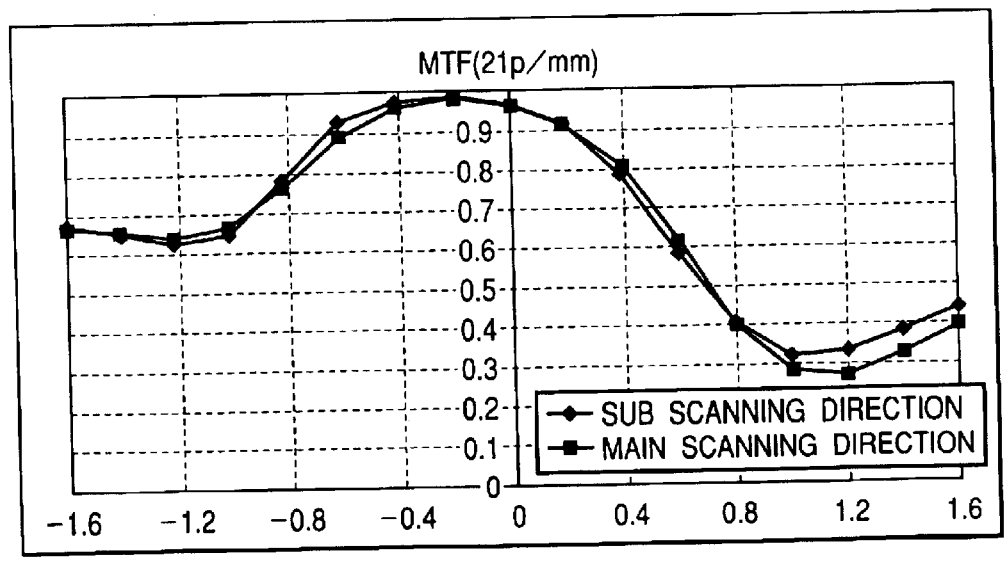
FIG. 22 is a diagram showing MTF in a case where an anamorphic surface is used in an imaging lens.

FIG. 22 shows MTF defocus curves of the imaging lens at 2 lp/mm in this embodiment. It can be understood from the curves that an astigmatic difference is corrected in comparison with the fifth embodiment.

(Seventh Embodiment)

A seventh embodiment of the present invention will be described.

The seventh embodiment relates to optical axis alignment of the optical system and is arranged to ensure the target performance by supplying a sufficiently large quantity of incident light to the sensor portion 33.

FIGS. 23A and 23B show examples of the light quantity distributions of beams from LEDs 31. Many of LEDs at typical-use level have their light distribution characteristics not guaranteed and sometimes have light distributions deviating largely from the front. If one of such LEDs is mounted in the normal mount position, the light beam from the LED 31 is not aligned with the optical axis of the optical system. In such a case, the sensor portion 33 is not irradiated with a sufficiently large quantity of light.

In this embodiment, a moving mechanism for adjusting the position of the light emitting portion is provided for use with the light source means 31 and/or a moving mechanism for adjusting the position of the light receiving position is provided for use with the light receiving means 33.

FIG. 24 shows the construction of an image sensing device 6 and an optical axis alignment jig (moving mechanism) in this embodiment. In this embodiment, the main scanning direction is defined in correspondence with the Y-axis, the sheet transport direction is defined in correspondence with the X-axis, and a direction perpendicular to an object 184 to be detected 184 is defined in correspondence with the Z-axis. A sensor holder 181 is fixed on the optical axis alignment jig.

A LED mount base 182 and a sensor portion 183 can be moved horizontally relative to the sensor holder 181 before being adjusted. The LED 31 can be mounted by being freely selecting its direction relative to the LED mount base 182. That is, the LED mount base 182 has a degree of freedom along each of the X- and Y-axis, the LED 31 has a degree of freedom in each of all inclination directions, and the sensor portion 183 has a degree of freedom along each of the X- and Y-axes.

In the measurement object mount place 184, an object to be placed is changed according to the adjustment target. For example, when the position of the LED 31 is adjusted, a CCD sensor is set in the measurement object mount place 184. At this time, the CCD sensor is placed so that a central portion of the CCD sensor coincides with the optical axis. First, the LED 31 is moved to such as position that the quality of light with which the central portion of the CCD sensor is irradiated is maximized. The movable portion of the LED 31 is thereafter fixed. Next, a reflecting plate having a high gross value (reflectivity) is set in the measurement object mount place 184. The sensor portion 183 is moved along the X- and Y-axes to determine a position at which the quantity of light detected is maximized. The movable portion of the sensor portion 183 is then fixed.

Adjustment is performed in this manner to ensure that a sufficiently large quantity of light can be supplied to the sensor portion even if a typical-use LED is used.

In this embodiment, as described above, the mount position of the light source (an LED in this embodiment) can be moved to an arbitrary position to achieve alignment of light beam from the light source with the optical axis of the illumination means, thereby obtaining a sufficiently large quantity of light. Also, the mount position of the sensor portion can be moved to an arbitrary position to perform fine adjustment even when the beam of reflected light deviates from the optical axis of the sensing optical system.

According to the present invention, an image sensing device and an image forming apparatus can be provided which are used to perform the process of forming a multi-color image by sensing images in component colors (position detection patterns), by controlling image forming sections for multicolor development, and by superposing the component color images, in which the configuration of the image sensing device for detecting images (position detection patterns) is suitably set to ensure accurate detecting of images (position detection patterns), and with which a high-quality color image can easily be obtained.

What is claimed is:

1. An image sensing device comprising:

light source means;

a recording member on which an image is formed, said recording member being conveyed in one direction;

illumination means for causing a light beam emitted from said light source means to obliquely illuminate said recording member; and imaging means for condensing specularly reflected light from the image on said recording member and causing the reflected light to travel to a surface of light receiving means, said image sensing device obtaining positional information of the image on said recording member on the basis of a signal obtained by said light receiving means, wherein when the amount of displacement of the recording member in a vertical direction during conveyance of said recording member is d, an angle between the optical axis of said imaging means and a normal to said recording member is θ (degrees), and resolution of the image formed on said recording member is R (dpi), the components are set so that $d \cdot \tan \theta < (25.4/R) \times 1000$ is satisfied.

2. A device according to claim 1, wherein the angle θ (degrees) satisfies $5° < \theta < 35°$.

3. A device according to claim 1, wherein said light source means comprises an LED light source, and said illumination means includes an illumination lens for condensing a light beam from said LED light source and causing the light beam to travel to said recording member.

4. A device according to claim 1, wherein said imaging means includes an imaging lens for forming, on a surface of said light receiving means, an image on said recording member.

5. A device according to claim 1, further comprising an imaging lens for forming, the image on the recording member onto said light receiving means, wherein when imaging magnification of said imaging lens is assumed to be β, $0.75 < |\beta| < 1.25$ is satisfied.

6. A device according to claim 1, wherein the angle θ (degrees) satisfies $25° < \theta < 35°$.

7. An image forming apparatus including an image sensing device according to claim 1, wherein said image forming apparatus includes a plurality of image bearing members and forms a color image by using said image sensing device.

8. An image sensing device comprising:

light source means;

illumination means for irradiating, with a light beam from said light source means, a recording member on which an image is formed; and imaging means for forming, onto a surface of a light receiving means, the image on said recording member, said image sensing device detecting the image on the recording member on the basis of a signal obtained by said light receiving means, wherein when said recording member has a specular reflection surface, a stop is provided to a position to be substantially optically conjugate with the light emitting point of said light source means.

9. A device according to claim 8, wherein when the imaging magnification at which the light emitting point of said light source is imaged at the conjugate position is assumed to be β, $1 < |\beta| < 7$ is satisfied.

10. A device according to claim 8, wherein the aperture of the stop has a size substantially equal to or smaller than the size of the image of the light emitting point of said light source means.

11. A device according claim 8, wherein the stop is disposed between said imaging means and said light receiving means.

12. A device according to claim 8, wherein said light receiving means detects the image formed on said recording member to obtain positional information of the image.

13. A device according to claim 8, wherein said light receiving means detects density of the image formed on said recording member.

14. An image forming apparatus including an image sensing device according to claim 8, wherein said image forming apparatus forms a color image by using said image sensing device, and wherein said image forming apparatus includes a plurality of image bearing members.

15. A device according to claim 8, wherein said illumination means includes an irradiation lens, wherein said imaging means includes an imaging lens, and wherein at least one of the surface of said irradiation lens and said imaging lens on said recording member side is flat.

16. A device according to claim 15, wherein at least one of said irradiation lens and said imaging lens has at least one rotationally symmetrical aspherical surface.

17. A device according to claim 15, wherein at least one of said irradiation lens and said imaging lens has at least one anamorphic surface.

18. A device according to claim 15, wherein at least one surface of said irradiation lens and said imaging lens is inclined relative to a surface normal to said recording member.

19. A device according to claim 15, wherein said irradiation lens and said imaging lens are formed integrally with each other and are made of a same material.

20. A device according to claim 15, wherein an optical axis of said irradiation lens and an optical axis of said imaging lens have equal angles formed in opposite directions from a surface normal to said recording member.

21. A device according to claim 15, wherein said light source means is provided with a moving mechanism capable of displacing to an arbitrary position.

22. A device according to claim 15, wherein said light receiving means is provided with a moving mechanism capable of displacing to an arbitrary position.

23. A device according to claim 15, wherein said imaging means has a stop, and a light emitting surface of said light receiving means and the stop are made substantially conjugate with each other when a surface of said recording member is a specular reflection surface.

24. A device according to claim 15, wherein said light receiving means detects the image formed on said recording member to obtain positional information of the image.

25. A device according to claim 15, wherein said light receiving means detects density of the image formed on said recording member.

* * * * *

UNITED STATES PATENT AND TRADEMARK OFFICE
CERTIFICATE OF CORRECTION

PATENT NO.     : 6,873,804 B2
DATED          : March 29, 2005
INVENTOR(S)    : Hidekazu Shimomura et al.

It is certified that error appears in the above-identified patent and that said Letters Patent is hereby corrected as shown below:

Column 1,
Line 51, "by" (1st occurrence) should be deleted.
Line 56, "light" (2nd occurrence) should read -- light, --.

Column 2,
Line 2, "to be" should read -- can be --.

Column 6,
Line 42, "diagram" should read -- diagrams --.
Line 58, "showing" should read -- showing on --.

Column 7,
Line 49, "cartridges" should read -- cartridge --.

Column 9,
Line 33, "61. Part" should read -- 61, part --.

Column 10,
Line 28, "to be" should read -- be --.

Column 14,
Line 12, "34aand" should read -- 34a and --.
Line 29, "magnification 1$\mu$1." should read -- magnification 1$\beta$1. --.
Line 56, "is .10" should read -- at 1.0 --.

Column 16,
Line 42, "surface" should read -- surface can --.

Column 18,
Line 11, "being" should be deleted.
Line 24, "such as" should read -- such a --.

Column 19,
Line 29, "forming," should read -- forming --.

UNITED STATES PATENT AND TRADEMARK OFFICE
CERTIFICATE OF CORRECTION

PATENT NO.     : 6,873,804 B2
DATED          : March 29, 2005
INVENTOR(S)    : Hidekazu Shimomura et al.

It is certified that error appears in the above-identified patent and that said Letters Patent is hereby corrected as shown below:

Column 20,
Line 7, "according" should read -- according to --.

Signed and Sealed this

Ninth Day of August, 2005

JON W. DUDAS
*Director of the United States Patent and Trademark Office*

UNITED STATES PATENT AND TRADEMARK OFFICE
CERTIFICATE OF CORRECTION

PATENT NO.         : 6,873,804 B2
APPLICATION NO. : 09/922643
DATED              : March 29, 2005
INVENTOR(S)        : Hidekazu Shimomura et al.

It is certified that error appears in the above-identified patent and that said Letters Patent is hereby corrected as shown below:

COLUMN 1:
Line 51, "by" ($1^{st}$ occurrence) should be deleted.
Line 56, "light" ($2^{nd}$ occurrence) should read --light,--.

COLUMN 2:
Line 2, "to be" should read --can be--.

COLUMN 6:
Line 42, "diagram" should read --diagrams--.
Line 58, "showing" should read --showing on--.

COLUMN 7:
Line 49, "cartridges" should read --cartridge--.

COLUMN 9:
Line 33, "61. Part" should read --61, part--.

COLUMN 10:
Line 28, "to be" should read --be--.

COLUMN 14:
Line 12, "34aand" should read --34a and--.
Line 29, "magnification 1µl." should read --magnification 1β1.--.
Line 56, "is .10" should read --at 1.0--.

COLUMN 16:
Line 42, "surface" should read --surface can--.

COLUMN 18:
Line 11, "being" should be deleted.
Line 24, "such as" should read --such a--.

COLUMN 19:
Line 29, "forming," should read --forming--.

UNITED STATES PATENT AND TRADEMARK OFFICE
CERTIFICATE OF CORRECTION

PATENT NO. : 6,873,804 B2
APPLICATION NO. : 09/922643
DATED : March 29, 2005
INVENTOR(S) : Hidekazu Shimomura et al.

It is certified that error appears in the above-identified patent and that said Letters Patent is hereby corrected as shown below:

COLUMN 20:
Line 7, "according" should read --according to--.

Signed and Sealed this

Fourth Day of March, 2008

JON W. DUDAS
*Director of the United States Patent and Trademark Office*